United States Patent Office 3,184,440
Patented May 18, 1965

3,184,440
INTERPOLYMER COMPRISING ACRYLIC ACID, AN ACRYLIC ACID ESTER AND A MALEIC ANHYDRIDE DERIVATIVE AND A PROCESS OF PREPARATION
Rajendra N. Chadha, Silver Spring, Donald E. Jefferson, Greenbelt, and Frank X. Werber, Rockville, Md., assignors to W. R. Grace & Co., New York, N.Y., a corporation of Connecticut
No Drawing. Filed July 17, 1962, Ser. No. 210,593
17 Claims. (Cl. 260—78.5)

The present invention relates to a novel and useful composition of matter, a process employing the composition and the final structure resulting from the process. More particularly, it is directed to an acrylic acid ester composition containing an acrylic acid, a polymerization process employing the composition and the product resulting from the process.

In a copending application, Serial No. 101,328, filed April 7, 1961, and now U.S. Patent Number 3,117,112, it is disclosed that vinyl monomers may be polymerized by subjecting the monomer to the action of a catalyst comprising an aluminum alkyl and oxygen. However, the invention has some drawbacks in that, under atmospheric conditions, the percentage conversion of the monomer to polymer and the rate of polymerization are relatively low. Also, the catalyst system will not readily produce coatings and films which are substantially free of cracks and other surface irregularities.

Accordingly, it is an object of the present invention to provide a composition which may be readily polymerized under atmospheric conditions by the mere exposure to an oxygen containing gas such as air. A further object is to provide a composition which will produce substantially crack free coatings and films. Another object is to provide a relatively simple and inexpensive polymerization process. A still further object is to provide a shaped article of the polymerized composition of matter. Another object is to provide a coated surface, a film and other shaped structures. Other objects will become apparent as the description of the invention proceeds.

These objects are accomplished by the present invention which provides a composition comprising (A) an acrylic acid ester, (B) from about 1 to about 15% by weight of an aluminum compound selected from the group consisting of alkyl aluminum dihalide, alkyl aluminum sesquihalide, dialkyl aluminum halide, dialkyl aluminum hydride and trialkyl aluminum, and (C) from about 0.05 to about 5% by weight of an acrylic acid of the formula

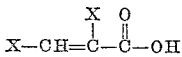

wherein each X is selected from the group consisting of hydrogen and lower alkyl, all percentages being based on the weight of the acrylic acid ester.

In a preferred embodiment of the present invention the composition comprises (A) an acrylic acid ester, (B) from about 1 to about 15% by weight of an aluminum compound selected from the group consisting of alkyl alluminum dihalide, alkyl aluminum sesquihalide, dialkyl aluminum halide, dialkyl aluminum hydride and trialkyl aluminum, and (C) from about 0.05 to about 5% by weight of an acrylic acid of the formula

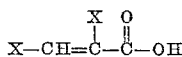

wherein each X is selected from the group consisting of hydrogen and lower alkyl, and (D) from about 0.2 to about 20% by weight of a maleic anhydride of the formula.

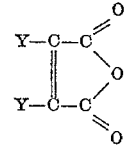

wherein each Y is selected from the group consisting of hydrogen and halogen, all percentages being based on the weight of the acrylic acid ester.

In a more preferred embodiment of the present invention the composition consists essentially of the above three ingredients and the aluminum compound is present in amounts from about 4.5 to about 5.5%, the acrylic acid is present in amounts of from about 1 to about 2% and the maleic anhydride is present in amounts of from about 0.2 to about 4%. The preferred procedure employs acrylic acid and acrylic acid esters derived from alkyl alcohols containing from 1 to 8 carbon atoms. The preferred maleic anhydrides are maleic anhydride per se and dichloromaleic anhydride.

The present invention also provides a polymerization process which comprises shaping the above composition and then exposing the composition to an oxygen containing gas to cause polymerization of the composition. The present invention also provides the product resulting from the polymerization process. Preferably, the product is a film or a coated surface.

The expression "acrylic acid ester" is used to signify esters of the formula

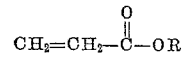

wherein R is an organic radical. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; dodecyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate; N,N - dimethylaminoethyl acrylate; 2-N-morpholinoethyl acrylate and tetrahydrofurfuryl acrylate. The esters may be used inidividually or in various combinations. Many others are known in the art and may likewise be used although the esters of alkyl alcohols having from 1 to 8 carbon atoms are preferred.

The term "lower alkyl" designates an alkyl radical having from 1 to 8 carbon atoms. However, it is preferred that such radicals have from 1 to 3 carbon atoms.

The phrase "consisting essenitally of" is used to signify a composition which contains only minor amounts of other materials such as dyes, pigments and the like. In general, such materials will be added in amounts of less than 5% and preferably 2% or less.

The term "exposing" merely signifies that free gaseous oxygen is allowed to come in contact with the composition. While any oxygen containing gas many be employed to cause polymerization, air is generally employed because of its obvious availability and cheapness. The contacting of the composition with air is generally carried out while the material is applied to the surface and for a short period thereafter. The time necessary to cause complete polymerization of the system is generally a matter of a few minutes but exposures of hours or even days may be desirable in certain instances.

Among the various alkyl aluminum compounds which may be employed in the present invention are triethyl aluminum; triethyl aluminum/diethyl aluminum hydride mixtures; triisobutyl aluminum; trimethyl aluminum; diethyl aluminum chloride; ethyl aluminum sesquichloride; methyl aluminum sesquichloride; methyl aluminum sesquibromide; trioctyl aluminum; tri-n-butyl aluminum, triisopropyl aluminum; tridodecyl aluminum; diethyl methyl aluminum; ethyl isobutyl aluminum; diisobutyl ethyl aluminum; diethyl aluminum bromide; diisobutyl aluminum chloride; diisobutyl aluminum bromide; dioctyl aluminum chloride; didodecyl aluminum chloride; diethyl aluminum hydride; diisobutyl aluminum hydride; dioctyl aluminum hydride and the like. The alkyl aluminum compounds may likewise be employed individually or in various mixtures.

Other α-olefin comonomers may be added to the acrylic acid esters employed in the present invention to modify somewhat the resulting products formed by the composition. In general, such α-olefin are added in amounts of less than about 5% and it is preferred that they contain 2% or less depending upon the particular comonomer employed. The suitable comonomers include such vinyl compounds such as vinyl acetate, vinyl propionate, vinylidene chloride and the acrylics.

The following examples are given to illustrate the invention and are not intended to limit it in any manner. All parts are expressed in part by weight unless otherwise indicated. The approximate percentage of each component of the composition (based on the weight of all acrylic acid esters in the composition, including the complexed form) is generally indicated after the weight of the component in the example. It should be noted that when comonomers such as vinyl acetate and the like are employed in the examples, such compounds are not acrylic acid esters and are not used to calculate percentages.

DETERMINATION OF CONVERSION

To determine the percentage conversion of the monomer to the polymeric state, 1.0 cc. of the mixture (known density) in the sealed tube is withdrawn by means of a syringe and squirted into a tared glass dish having an average diameter of about 2.8 centimeters and a depth of about 2.0 centimeters. The dishes are placed in a closed box for about 24 hours to insure complete polymerization. The dishes are then placed in a vacuum oven kept at room temperature and a vacuum of about 25 mm. of mercury. After the samples have attained constant weight, the percentage conversion is determined by the formula $$\text{Percent conversion} = \frac{\text{Weight of final sample}}{\text{Original weight of sample}} \times 100$$

EXAMPLES

*Preparation of composition, coatings and films*

A 20 cc. test tube is dried in an oven at 120° C. for 2 hours. If a maleic anhydride is to be added it is added at this stage as Composition 1. The tube is flushed with nitrogen and sealed with a serum stopper. The monomeric formulation, Composition 2, is then injected into the tube by means of a hypodermic needle. The tube is cooled and maintained at a temperature of −10 to −20° C. Then the aluminum alkyl, Composition 3, is injected into the tube by means of a hypodermic needle and the composition in the tube is allowed to warm to room temperature. The aluminum alkyl Composition 3 is either the aluminum alkyl compound per se or a complex of the aluminum alkyl and the acrylic acid ester which is formed by adding the aluminum alkyl to the acrylic acid ester in a 1/1 mole ratio. The diisobutyl aluminum hydride/butyl acrylate complex generally employed contains approximately 52% of the aluminum alkyl and 48% of the acrylic acid ester on a weight basis.

To determine the coating properties of the resulting composition, 1.0 cc. of the composition is withdrawn from the tube by means of a syringe and immediately spread to a thickness of 3–6 mils upon a 3″ x 4″ glass plate previously rinsed twice with acetone to remove residual greases and oils. The coated plates are then placed on a draft-free shelf and allowed to cure in contact with the free oxygen in the air for about 16 hours and the properties of the resulting coating noted. In some instances, the coating is peeled from the plate and the film properties noted.

EXAMPLE 1

The above described procedure is carried out employing the following:

Composition 1: None used
Composition 2: A liquid monomeric formulation containing 0.06 g. (1.3%) of acrylic acid and 4.41 g. butyl acrylate
Composition 3: A liquid complex containing 0.23 g. (5.0%) of diisobutyl aluminum hydride and 0.21 g. of butyl acrylate The composition will stay fluid in the sealed tube for about 3 minutes before setting solid.

A coated plate is prepared from the fluid composition as described above. The coating sets clear and tack free in about 1–2 minutes. After the 16 hours, the coating is hard, glossy, substantially crack free and adheres well to the glass. Upon peeling the film from the glass it is found to be tough and flexible.

The percentage conversion of the monomer to the polymeric state is found to be 61.9% when tested as described above.

The example demonstrates that while the maleic anhydride (Composition 1) is not absolutely essential for good coating and film properties, the "pot life" of the composition is quite short in its absence.

*Control*

The procedure of Example 1 is repeated omitting the acrylic acid from Composition 2. The components are as follows:

Composition 1: None used
Composition 2: 4.41 g. of liquid butyl acrylate
Composition 3: A liquid complex containing 0.23 g. (5.0%) of diisobutyl aluminum hydride and 0.21 g. of butyl acrylate The composition will stay fluid in the sealed tube for about 24 hours before setting to a tacky mass.

A coated plate is prepared from the fluid composition as described above. The coating does not set tack free even after 16 hours. It is sticky and many large cracks develop. The coating cannot be peeled from the glass as a film.

The percentage conversion of the monomer to the polymeric state is found to be about 33%.

The Control procedure demonstrates the need for the acrylic acid if good coatings are to be obtained or if high conversions are desired.

EXAMPLE 2

The above described procedure is carried out employing the following:

Composition 1: 0.03 g. (0.7%) of maleic anhydride
Composition 2: The liquid monomeric formulation is the same as Example 1
Composition 3: The liquid complex is the same as Example 1

The composition stays fluid in the sealed tube for about 12–18 hours before setting solid.

A coated plate is prepared from the fluid composition as described above. The coating sets clear and tack free in about 1–2 minutes. After 16 hours the coating is hard, glossy and substantially crack free and adheres well to the glass. Upon peeling the film from the glass it is found to be tough and flexible.

The percentage conversion of the monomer to the polymeric state is found to be 61.4% when tested as described above.

The example demonstrates the increased "pot life" of the composition when a small amount of a maleic anhydride is added to the system.

EXAMPLES 3 AND 4

The above described procedure is carried out employing:

Composition 1: 0.1418 g. (3.1%) maleic anhydride
Composition 2: A liquid monomeric formulation containing 0.0656 g. (1.4%) acrylic acid and 4.4148 g. of butyl acrylate
Composition 3: A liquid complex containing 0.225 g. (4.9%) of diisobutyl aluminum hydride and 0.208 g. of butyl acrylate The composition will stay fluid in the sealed tube for about 30 hours.

A coated plate is prepared from the liquid composition as described above. The coating sets clear and tack free in less than 5 minutes. After the 16 hours, the coating is smooth, crack free and adheres well to the glass.

The coating is peeled from the glass plate and the film properties tested. The film is 3.6 mils thick and has a modulus @ 1% elongation of 9721 p.s.i., a tensile strength of 569 p.s.i., a density of 1.169 g./cc. and an elongation at break of 46.2%.

A thinner film is prepared and tested in the same manner from a second portion of the composition. The film is 2.2 mils thick and has a modulus @ 1% elongation of 13,805 p.s.i., a tensile strength of 520 p.s.i., a density of 1.164 g./cc. and an elongation at break of 15.3%.

The percentage conversion of the monomer to the polymeric state is found to be 43.3%.

EXAMPLE 5

The composition of Examples 3 and 4 is again made into film as described in the examples.

The film is 3 mils in thickness and is cut into 2" long strips 0.75" wide. To check the heat stability of the strips, a strip is suspended in a heated air oven with a 10 g. weight attached to the strip. The weight roughly corresponds to 8 p.s.i. The temperature of the oven is gradually raised. As each of the following temperatures is reached, the oven is maintained at the indicated temperature for a period of 1 hour and the color of the strip noted. The total heating time is 16 hours when the time necessary to reach each temperature is included in the total time.

| Temperature: | Observation |
| --- | --- |
| 105° C | No visible change. |
| 145° C | Do. |
| 163° C | Do. |
| 174° C | Slight yellowing. |
| 222° C | Yellow. |
| 250° C | Dark brown, brittle—no elongation noted. |

The example demonstrates that the film is quite resistant to heat over a quite wide temperature range.

EXAMPLES 6–10

In order to study the effect of the concentration of Composition 3 on the final coating, various formulations are applied to glass plates as previously described. In each formulation, the amounts of Compositions 1 and 2 are kept constant and the amount of Composition 3 varied. The formulations are as follows:

Composition 1: 0.1008 g. maleic anhydride
Composition 2: A liquid monomeric formulation containing 0.0656 g. acrylic acid and 4.4148 g. of butyl acrylate
Example 6—Composition 3: A liquid complex containing 0.068 g. (1.5%) diisobutyl aluminum hydride and 0.063 g. butyl acrylate
Example 7—Composition 3: A liquid complex containing 0.116 g. (2.5%) of diisobutyl aluminum hydride and 0.107 g. of butyl acrylate
Example 8—Composition 3: A liquid complex containing 0.226 g. (4.9%) of diisobutyl aluminum hydride and 0.209 g. of butyl acrylate
Example 9—Composition 3: A liquid complex containing 0.439 g. (9.1%) of diisobutyl aluminum hydride and 0.406 g. of butyl acrylate
Example 10—Composition 3: A liquid complex containing 0.658 g. (13.1%) of diisobutyl aluminum hydride and 0.608 g. of butyl acrylate The coatings produced by the various compositions are good to excellent. It is found from the quite limited data, that the "pot life" of the compositions increase with increasing concentrations of Composition 3. Substantially no difference is noted in the time required to obtain tack-free coatings. Increasing the amount of Composition 3 increases stiffness and decreases clearness. In Examples 6 to 8, the coatings contain less surface faults or irregularities than in Examples 9 and 10. The percent conversion of the monomer into polymer increases from Examples 6 to 8 and then decreases somewhat in both Examples 9 and 10.

EXAMPLE 11

The above described procedure is carried out employing the following:

Composition 1: 0.0131 g. (0.3%) maleic anhydride
Composition 2: A liquid monomeric formulation containing 0.0531 g. (1.1%) of acrylic acid and 4.870 g. of isobuptyl acrylate
Composition 3: A liquid complex containing 0.231 g. (4.6%) of diisobutyl aluminum hydride and 0.213 g. of butyl acrylate The composition will stay fluid in the sealed tube for about 2 hours.

A coated plate is prepared from the fluid composition as described above. The coating sets clear and tack free in about 1–2 minutes. After the 16 hours, the coating is hard and clear. It is substantially crack free and adheres well to the glass. Upon peeling the film from the glass it is found to be tough and flexible.

The example demonstrates the use of the isobutyl acrylate monomer in the composition.

EXAMPLE 12

The above described procedure is carried out employing the following:

Composition 1: None used
Composition 2: A liquid monomeric formulation containing 0.0531 g. (1.0%) of acrylic acid, 5.364 g. of butyl acrylate and 0.273 g. (4.8%) of vinyl propionate
Composition 3: A liquid complex containing 0.240 g. (4.3%) of diisobutyl aluminum hydride and 0.222 g. of butyl acrylate The composition will stay fluid in the sealed tube for about 2 minutes before setting solid.

A coated plate is prepared from the fluid composition as described above. The coating sets clear and tack free in about 1 minute. After the 16 hours, the coating is clear, smooth and crack free. It gives fair adhesion to the glass. Upon peeling the film from the glass it is found to be harder and less flexible than film produced by Example 1.

The example, as in Example 1, demonstrates that Composition 1 is not essential unless a longer "pot life" is necessary or desirable. In addition, the example demonstrates the use of the vinyl propionate comonomer in the composition.

EXAMPLE 13

The above described procedure is carried out employing the following:

Composition 1: 0.0402 g. (0.8%) of maleic anhydride
Composition 2: A liquid monomeric formation containing 0.0526 g. (1.1%) of acrylic acid and 4.5742 g. of ethyl acrylate
Composition 3: A liquid complex containing 0.235 g. (4.9%) of diisobutyl aluminum hydride and 0.217 g. of butyl acrylate The composition will stay fluid in the sealed tube for about 6 hours before setting solid.

A coated plate is prepared from the fluid composition as described above. The coating sets clear and tack free in about 2 minutes. After the 16 hours, the coating is hard, glossy, substantially crack free and adheres well to the glass. Upon peeling the film from the glass it is found to be tough, clear and elastic.

The percentage conversion of the monomer to the polymeric state is found to be 55.0%.

The example demonstrates the use of the ethyl acrylate monomer in the composition.

EXAMPLE 14

The above described procedure is carried out employing the following:

Composition 1: 0.0376 g. (0.8%) maleic anhydride
Composition 2: A liquid monomeric formulation containing 0.0526 g. (1.1%) acrylic acid, 0.1868 g. (3.9%) of vinyl acetate and 4.5742 g. of ethyl acrylate
Composition 3: A liquid complex containing 0.231 g. (4.8%) of diisobutyl aluminum hydride and 0.231 g. of butyl acrylate The composition will stay fluid in the sealed tube for about 8 hours before setting solid.

A coated plate is prepared from the fluid composition as described above. The coating sets tack free in about 1 minute. After the 16 hours, the coating is hard, clear, crack free and is somewhat harder than the coating of Example 13. Upon peeling the film from the glass it is found to be clear and somewhat less flexible than the film of Example 13.

The percentage conversion of the monomer to the polymeric state is found to be 62.5%.

The example demonstrates the use of the vinyl acetate comonomer in the composition.

EXAMPLE 15

The above described procedure is carried out employing the following:

Composition 1: None used
Composition 2: A liquid monomeric formulation containing 0.0526 g. of acrylic acid and 4.391 g. of 2-ethylhexyl acrylate
Composition 3: A liquid complex containing 0.233 g. (5.1%) of diisobutyl aluminum hydride and 0.216 g. of butyl acrylate The composition will stay fluid in the sealed tube for about 8 minutes before setting solid.

A coated plate is prepared from the fluid composition as described above. The coating sets clear and tack free in about 1-2 minutes. After the 16 hours, the coating is clear, glossy, substantially crack free and adheres fairly well to the glass. Upon peeling the film from the glass, it is found to be clear and flexible.

The example demonstrates the use of the 2-ethyhexyl acrylate monomer in the composition without employing the maleic anhydride in Composition 1.

EXAMPLE 16

The above described procedure is carried out employing the following:

Composition 1: 0.0439 g. (1.0%) maleic anhyride
Composition 2: Same as Example 15
Composition 3: Same as Example 15

The composition will stay fluid in the sealed tube for about 2 hours before setting solid.

A coated plate is prepared from the fluid composition as described above. The coating sets clear and tack free in about 1 minute. After the 16 hours, the coating is smooth, clear, substantially crack free and adheres well to the glass. Upon peeling the film from the glass, it is found to be a clear, tough, leathery material.

The example demonstrates the use of the 2-ethylhexyl acrylate monomer in the composition. In addition, it demonstrates the increased "pot life" over Example 15, which is obtained by utilizing a maleic anhydride.

EXAMPLE 17

The above described procedure is carried out employing the following:

Composition 1: 0.1943 g. (3.8%) maleic anhydride
Composition 2: A liquid monomeric formulation containing 0.0531 g. (1.0%) of acrylic acid and 4.987 g. of 3-methoxybutyl acrylate
Composition 3: A liquid complex containing 0.214 g. (4.1%) of diisobutyl aluminum hydride and 0.197 g. of butyl acrylate The composition will stay fluid in the sealed tube for about 9 hours before setting solid.

A coated plate is prepared from the fluid composition as described above. The coating sets clear and tack free in about 2 minutes. After the 16 hours, the coating contains some ripples and is hard, glossy, substantially crack free and adheres very well to the glass. Upon peeling the film from the glass, it is found to be tough, clear and crack free.

The example demonstrates the use of the 3-methoxybutyl acrylate monomer in the composition.

EXAMPLE 18

The above described procedure is carried out employing the following:

Composition 1: 0.0984 g. (1.9%) maleic anhydride
Composiion 2: A liquid monomeric formulation containing 0.2216 g. (4.3%) crotonic acid and 4.987 g. of 3-methoxybutyl acrylate
Composition 3: A liquid complex containing 0.221 g. (4.3%) of diisobutyl aluminum hydride and 0.202 g. of butyl acrylate The composition will stay fluid in the sealed tube for about 4 hours before setting solid.

A coated plate is prepared from the fluid composition as described above. The coating sets clear and tack free free in about 2 minutes. After the 16 hours, the coating is clear, smooth, substantially crack free and adheres well to the glass. Upon peeling the film from the glass, it is found to be fairly hard, clear and brittle.

The example demonstrates the use of a substituted acrylic acid (crotonic acid) in the composition.

EXAMPLE 19

The above described procedure is carried out employing the following:

Composition 1: 0.092 g. (2.0%) maleic anhydride
Composition 2: A liquid monomeric formulation containing 0.171 g. (3.6%) of crotonic acid and 4.470 g. of butyl acrylate Composition 3: A liquid complex containing 0.232 g. (5.0%) of diisobutyl aluminum hydride and 0.214 g. of butyl acrylate The composition will stay fluid in the sealed tube for about 20 hours before setting solid.

A coated plate is prepared from the fluid composition as described above. The coating sets clear and tack free in about 3–5 minutes. After the 16 hours, the coating is clear, hard, smooth, substantially crack free and adheres well to the glass. Upon peeling the film from the glass, it is found to be tough and leathery.

The example demonstrates the use of a substituted acrylic acid (crotonic acid) in the composition with a monomer different from that in Example 18.

EXAMPLE 20

The above described procedure is carried out employing the following:

Composition 1: None used
Composition 2: A liquid monomeric formulation containing 0.0531 g. (1.2%) of crotonic acid and 4.4257 g. of butyl acrylate
Composition 3: A liquid complex containing 0.219 g. (4.7%) of diisobutyl aluminum hydride and 0.203 g. of butyl acrylate The composition will stay fluid in the sealed tube for about 47 minutes before setting solid.

A coated plate is prepared from the fluid composition as described above. The coating sets clear and tack free in about 3–5 minutes. After the 16 hours, the coating is clear, hard, smooth, substantially crack free and adheres very well to the glass. Upon peeling the film from the glass, it is found to be clear, crack free and very elastic.

The example demonstrates the use of a substituted acrylic acid (crotonic acid) in the composition without employing a maleic anhydride as in Examples 18 and 19. The "pot life" of the composition is substantially shortened when the maleic anhydride is omitted but good coating properties are still obtained.

EXAMPLE 21

The following described procedure is carried out employing the following:

Composition 1: 0.0561 g. (1.2%) maleic anhydride
Composition 2: A liquid monomeric formulation containing 0.0625 g. (1.3%) of methacrylic acid and 4.4148 g. of butyl acrylate
Composition 3: A liquid complex containing 0.228 g. (4.9%) of diisobutyl aluminum hydride and 0.210 g. of butyl acrylate The composition will stay fluid in the sealed tube for about 24 hours before setting solid.

A coated plate is prepared from the fluid composition as described above. The coating sets clear and tack free in about 2–5 minutes. After the 16 hours, the coating is fairly hard, glossy, substantially crack free and adheres well to the glass. Upon peeling the film from the glass, it is found to be clear, tough, leathery material.

The example demonstrates the use of another substituted acrylic acid (methacrylic acid) in the composition.

EXAMPLE 22

The above described procedure is carried out employing the following:

Composition 1: 0.0187 g. (0.4%) maleic anhydride
Composition 2: A liquid monomeric formulation containing 0.0656 g. (1.5%) of acrylic acid and 4.4148 g. of butyl acrylate
Composition 3: 0.1982 g. (4.5%) of liquid triisobutyl aluminum (no complex)

The composition will stay fluid in the sealed tube for about 4 hours before setting solid.

A coated plate is prepared from the fluid composition as described above. The coating sets clear and tack free in about 5 minutes. After 16 hours, the coating is clear, smooth, substantially crack free and adheres well to the glass. Upon peeling the film from the glass, it is found to be clear and slightly elastic.

The percentage conversion of the monomer to the polymeric state is found to be 59.4%.

The example demonstrates the use of triisobutyl aluminum in the composition.

EXAMPLE 23

The above described procedure is carried out employing the following:

Composition 1: 0.1243 g. (2.7%) maleic anhydride
Composition 2: A liquid monomeric formulation containing 0.0526 g. (1.1%) of acrylic acid and 4.574 g. of ethyl acrylate
Composition 3: 0.2137 g. (4.7%) of diisobutyl aluminum (no complex)

The composition will stay fluid in the sealed tube for about 8 hours before setting solid.

A coated plate is prepared from the fluid composition as described above. The coating sets clear and tack free in about 1 minute. After the 16 hours, the coating is clear, slightly rippled, glossy, substantially crack free and adheres well to the glass. Upon peeling the film from the glass, it is found to be tough, clear and flexible.

The percentage conversion of the monomer to the polymeric state is found to be 48.3%.

The example demonstrates the use of diisobutyl aluminum chloride in the composition.

EXAMPLE 24

The above described procedure is carried out employing the following:

Composition 1: 0.0783 g. (1.8%) maleic anhydride
Composition 2: A liquid monomeric formulation containing 0.0656 g. (1.5%) of acrylic acid and 4.4148 g. of butyl acrylate
Composition 3: 0.2175 g. (4.9%) of butyl aluminum dichloride (no complex)

The composition will stay fluid in the sealed tube for about 24 hours before setting solid.

A coated plate is prepared from the fluid composition as described above. The coating sets clear and tack free in about 2–5 minutes. After the 16 hours, the coating is smooth, slightly discolored, substantially crack free and adheres well to the glass. Upon peeling the film from the glass, it is found to be slightly brittle.

The percentage conversion of the monomer to the polymeric state is found to be 41.1%.

The example demonstrates the use of butyl aluminum dichloride in the composition.

EXAMPLE 25

The above described procedure is carried out employing the following:

Composition 1: 0.0921 g. (2.1%) maleic anhydride
Composition 2: A liquid monomeric formulation containing 0.0656 g. (1.5%) of acrylic acid and 4.4148 g. of butyl acrylate
Composition 3: 0.2970 g. (6.7%) of liquid diethyl aluminum chloride (no complex)

The composition will stay fluid in the sealed tube for about 12 hours before setting solid.

A coated plate is prepared from the fluid composition as described above. The coating sets clear and tack free in about 2 minutes. After the 16 hours, the coating is hard, slightly yellow and rippled. It is substantially crack free and adheres very well to the glass.

The percentage conversion of the monomer to the polymeric state is found to be 62.8%.

The example demonstrates the use of diethyl aluminum chloride in the composition.

EXAMPLE 26

The above described procedure is carried out employing the following:

Composition 1: 0.1213 g. (2.6%) maleic anhydride
Composition 2: A liquid monomeric formulation containing 0.526 g. (1.1%) of acrylic acid and 4.7178 g. of methyl acrylate
Composition 3: 0.3760 g. (8.0%) of liquid ethyl aluminum dichloride (no complex)

The composition will stay fluid in the sealed tube for about 18 hours before setting solid.

A coated plate is prepared from the fluid composition as described above. The coating sets tack free in about 1–5 minutes. After the 16 hours, the coating is hazy, smooth, substantially crack free and adheres very well to the glass. Upon peeling the film from the glass (very difficult), it is found to be hazy and very elastic.

The percentage conversion of the monomer to the polymeric state is found to be 47.4%.

The example demonstrates the use of the methyl acrylate and ethyl aluminum dichloride in the composition.

EXAMPLE 27

The above described procedure is carried out employing the following:

Composition 1: 0.1013 g. (2.1%) of dichloro maleic anhydride
Composition 2: A liquid monomeric formulation containing 0.0526 g. (1.1%) of acrylic acid and 4.5742 g. of ethyl acrylate
Composition 3: A liquid complex containing 0.232 g. (4.9%) of diisobutyl aluminum hydride and 0.213 g. of butyl acrylate The composition will stay fluid in the sealed tube for about 12 hours before setting solid.

A coated plate is prepared from the fluid composition as described above. The coating sets tack free in about 1–5 minutes. After the 16 hours, the coating is slightly yellow, smooth, substantially crack free and adheres well to the glass. Upon peeling the film from the glass, it is found to be a tough, elastic material.

The percentage conversion of the monomer to the polymeric state is found to be 71.1%.

The example demonstrates the use of dichloro maleic anhydride in the composition.

EXAMPLE 28

The above described procedure is carried out employing the following:

Composition 1: 0.1079 g. (2.2%) maleic anhydride
Composition 2: A liquid monomeric formulation containing 0.0526 g. (1.1%) of acrylic acid and 4.5742 g. of ethyl acrylate
Composition 3: A liquid complex containing 0.230 g. (4.9%) of diisobutyl aluminum hydride and 0.213 g. of butyl acrylate The composition will stay fluid in the sealed tube for about 12 hours before setting solid.

A coated plate is prepared from the fluid composition as described above. The coating sets clear and tack free in about 1–2 minutes. After the 16 hours, the coating is clear, substantially crack free and adheres well to the glass. Upon peeling the film from the glass, it is found to be tough, clear and elastic.

The percentage conversion of the monomer to the polymeric state is found to be 51.2%.

EXAMPLE 29

The above described procedure is carried out employing the following:

Composition 1: 0.0896 g. (1.9%) maleic anhydride
Composition 2: A liquid monomeric formulation containing 0.0526 g. (1.1%) of acrylic acid, 0.0938 g. (2.0%) of N,N-diethylacrylamide and 4.4257 g. of butyl acrylate
Composition 3: A liquid complex containing 0.2315 g. (5.0%) of diisobutyl aluminum hydride and 0.2137 g. of butyl acrylate The composition will stay fluid in the sealed tube for about 18 hours before setting solid.

A coated plate is prepared from the fluid composition as described above. The coating sets clear and tack free in about 3 minutes. After the 16 hours, the coating is clear and crack free. The coating will not peel from the glass.

The example demonstrates the use of N,N-diethylacrylamide comonomer in the composition.

EXAMPLE 30

The above described procedure is carried out employing the following:

Composition 1: None used
Composition 2: A liquid monomeric formulation (4.8%) containing 0.0531 g. (1.0%) of acrylic acid, 0.2725 g. (4.8%) vinyl propionate and 5.3642 g. of butyl acrylate
Composition 3: A liquid complex containing 0.2326 g. (4.2%) of diisobutyl aluminum hydride and 0.2147 g. of butyl acrylate The composition will stay fluid in the sealed tube for about 5 minutes before setting solid.

A coated plate is prepared from the fluid composition as described above. The coating sets clear and tack free in about 1 minute. After the 16 hours, the coating is clear, substantially crack free and adheres well to the glass.

The percentage conversion of the monomer to the polymeric state is found to be 52.7%.

EXAMPLE 31

The above described procedure is carried out employing the following:

Composition 1: 0.876 g. (18.3%) maleic anhydride
Composition 2: A liquid monomeric formulation containing 0.0527 g. (1.1%) of acrylic acid and 4.5742 g. of ethyl acrylate
Composition 3: A liquid complex containing 0.2234 g. (4.7%) of biisobutyl aluminum hydride and 0.2042 g. of butyl acrylate The composition will stay fluid in the sealed tube for over 96 hours before setting solid.

A coated plate is prepared from the fluid composition as described above. The coating sets clear and tack free in about 2 minutes. After the 16 hours, the coating is very hard.

EXAMPLE 32

The above described procedure is carried out employing the following:

Composition 1: 0.2208 g. (4.6%) maleic anhydride
Composition 2: A liquid monomeric formulation containing 0.0266 g. (0.6%) of acrylic acid and 4.6203 g. of ethyl acrylate
Composition 3: A liquid complex containing 0.2321 g. (4.8%) of diisobutyl aluminum hydride and 0.2142 g. of butyl acrylate The composition will stay fluid in the sealed tube for about 12 hours before setting solid.

A coated plate is prepared from the fluid composition as described above. The coating sets clears and tack free in about 1 minute. After the 16 hours, the coating is hard and clear. Upon peeling the film from the glass, it is found to be tough, clear and slightly elastic.

EXAMPLE 33

When Example 26 is repeated employing 0.3760 g. (8.0) of ethyl aluminum sesquichloride, substantially the same results are obtained.

While in the above examples unmodified acrylic acid ester compositions are produced, it is obvious that other materials such as dyes, pigments, fibers, comonomers and other polymers may be introduced into the compositions of the present invention without substantial alteration of the physical properties of the products formed from the compositions. The compositions formed in accordance with the present invention can be brushed or sprayed onto a surface to form protective films for wood, metal and the like. They may also be applied to glass surfaces to form a safety film on the glass. In addition, the compositions may be formed into films which are suitable for wrapping materials, moisture barriers and the similar products.

Many equivalent modifications will be apparent to those skilled in the art from a reading of the foregoing without a departure from the inventive concept.

What is claimed is:

1. A composition comprising (A) an acrylic acid ester, (B) from about 1 to about 15% by weight of an aluminum compound selected from the group consisting of alkyl aluminum dihalide, alkyl aluminum sesquihalide, dialkyl aluminum halide, dialkyl aluminum hydride and triakyl aluminum, and (C) from about 0.05 to about 5% by weight of an acrylic acid of the formula

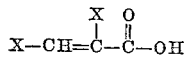

wherein each X is selected from the group consisting of hydrogen and lower alkyl, and (D) from about 0.2 to about 20% by weight of a maleic anhydride of the formula

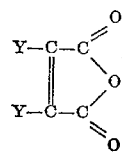

wherein each Y is selected from the group consisting of hydrogen and halogen, all percentages being based on the weight of the acrylic acid ester.

2. A composition comprising (A) an acrylic acid ester, (B) from about 4.5 to about 5.5% by weight of an aluminum compound selected from the group consisting of alkyl aluminum dihalide, alkyl aluminum sesquihalide, dialkyl aluminum halide, dialkyl aluminum hydride and triakyl aluminum, (C) from about 1 to about 2% by weight of an acrylic acid of the formula

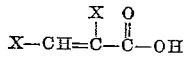

wherein each X is selected from the group consisting of hydrogen and lower alkyl, and (D) from about 0.2 to about 4% by weight of a maleic anhydride of the formula

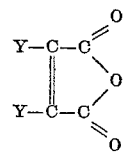

wherein each Y is selected from the group consisting of hydrogen and halogen, all percentages being based on the weight of the acrylic acid ester.

3. The composition of claim 2 wherein the acrylic acid ester is methyl acrylate.

4. The composition of claim 2 wherein the acrylic acid ester is ethyl acrylate.

5. The composition of claim 2 wherein the acrylic acid ester is butyl acrylate.

6. The composition of claim 2 wherein the aluminum compound is a dialkyl aluminum hydride.

7. The composition of claim 2 wherein the aluminum compound is a dialkyl aluminum halide.

8. The composition of claim 2 wherein the aluminum compound is a trialkyl aluminum.

9. The composition of claim 2 wherein the aluminum compound is a diisobutyl aluminum hydride.

10. The composition of claim 2 wherein each X is hydrogen.

11. The composition of claim 2 wherein one X is hydrogen and the other is methyl.

12. The composition of claim 2 wherein each Y is hydrogen.

13. The composition of claim 2 wherein each Y is chlorine.

14. A polymerization process which comprises shaping the composition of claim 1 and exposing the composition to an oxygen containing gas to cause polymerization of the composition.

15. A polymerization process which comprises shaping the composition of claim 2 and exposing the composition to an oxygen containing gas to cause polymerization of the composition.

16. A polymerization process which comprises applying the composition of claim 1 to a surface and exposing the coated surface to an oxygen containing gas to cause polymerization of the composition on the surface.

17. A polymerization process which comprises applying the composition of claim 2 to a surface and exposing the coated surface to an oxygen containing gas to cause polymerization of the composition on the surface.

References Cited by the Examiner

UNITED STATES PATENTS

| | | | |
|---|---|---|---|
| 2,378,629 | 6/45 | Hanford | 260—80.5 X |
| 2,772,251 | 11/56 | Hansen et al. | 260—86.1 X |
| 3,103,503 | 9/63 | Fox et al. | 260—89.5 |
| 3,117,112 | 1/64 | Mirabile et al. | 260—89.5 X |

JOSEPH L. SCHOFER, *Primary Examiner.*

JOSEPH R. LIBERMAN, LEON J. BERCOVITZ,
*Examiners.*